United States Patent [19]

Glover

[11] Patent Number: 5,489,486

[45] Date of Patent: Feb. 6, 1996

[54] SELECTABLE CONNECTION BATTERY HOUSING APPARATUS

[76] Inventor: Darrell F. Glover, 16 Chambers St. #16, El Cajon, Calif. 92020

[21] Appl. No.: 330,585

[22] Filed: Oct. 28, 1994

[51] Int. Cl.⁶ .................................................. H01M 2/10
[52] U.S. Cl. ............................ 429/100; 429/96; 429/99; 429/49; 439/500
[58] Field of Search .................................. 429/96, 97, 98, 429/99, 100, 177, 175, 49, 123, 1; 439/500, 166, 171, 173

[56] References Cited

U.S. PATENT DOCUMENTS

| | | | |
|---|---|---|---|
| 2,449,811 | 9/1948 | Harford | 429/97 |
| 2,590,804 | 3/1952 | Vitale | 429/97 |
| 3,718,848 | 2/1973 | Hines . | |
| 4,409,537 | 10/1983 | Harris . | |
| 4,581,570 | 4/1986 | Mejia . | |
| 5,104,752 | 4/1992 | Baughman et al. | 429/123 |
| 5,121,046 | 6/1992 | McCullough . | |
| 5,217,824 | 6/1993 | Womack | 429/97 |
| 5,227,263 | 7/1993 | Blier | 429/100 |
| 5,230,967 | 7/1993 | Radmall . | |
| 5,276,593 | 1/1994 | Lighthill et al. | 362/72 |

*Primary Examiner*—Prince Willis, Jr.
*Assistant Examiner*—Carol Chaney

[57] ABSTRACT

A selectable connection battery housing apparatus includes a central wall assembly which defines a battery receiving region. A first housing cap assembly is selectively connectable to and removable from a first end portion of the central wall assembly, and a second housing cap assembly is selectively connectable to and removable from a second end portion of the central wall assembly. Each housing cap assembly includes a first surface which includes a first conductive strip adapted to connect to at least three first ends of three batteries retained in the battery receiving region inside the central wall assembly. The first housing cap assembly includes a second surface opposite to the first surface. The second surface includes a second conductive strip adapted to contact first ends of two of the at least three batteries and includes a third conductive strip adapted to contact a first end of one of the at least three batteries. A bridge conductor is connected between the first conductive strip and the third conductive strip of the each housing cap assembly. In one orientation of the housing cap assemblies, the batteries are arranged in parallel. In another orientation of the housing cap assemblies, the batteries are arranged in series.

3 Claims, 3 Drawing Sheets

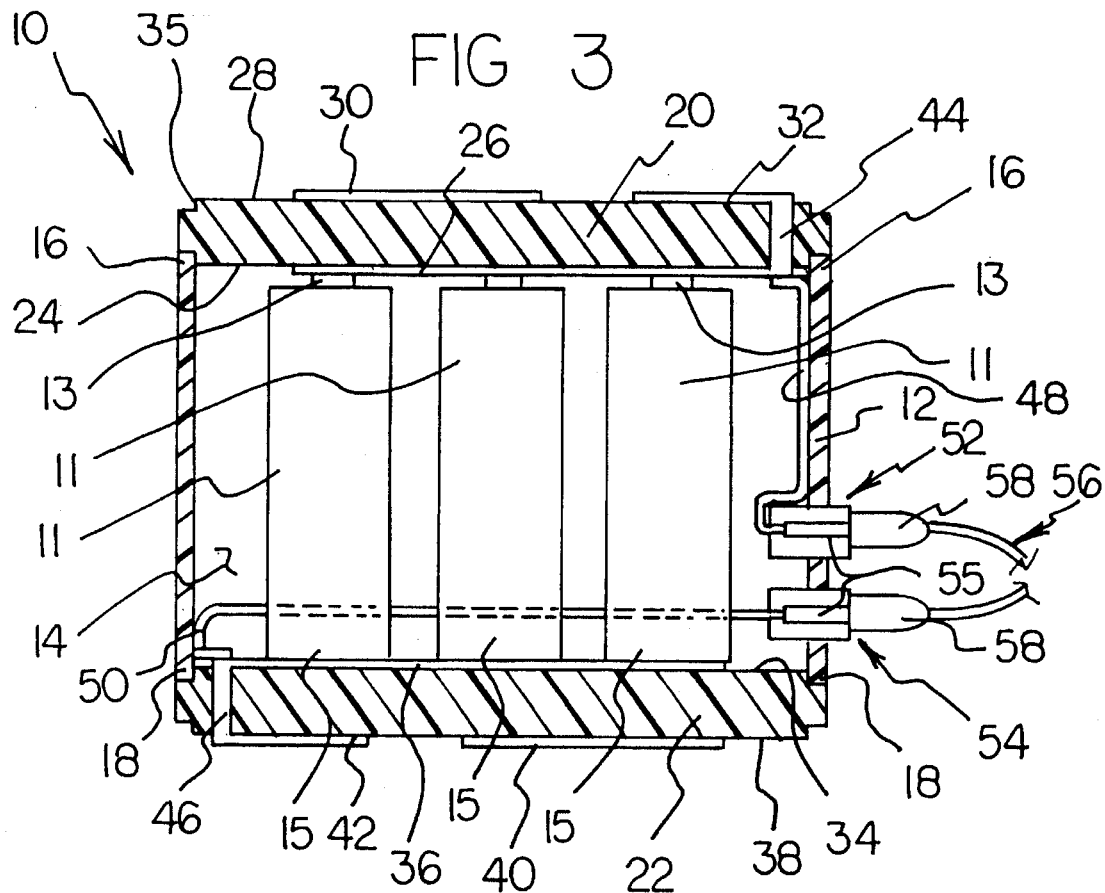
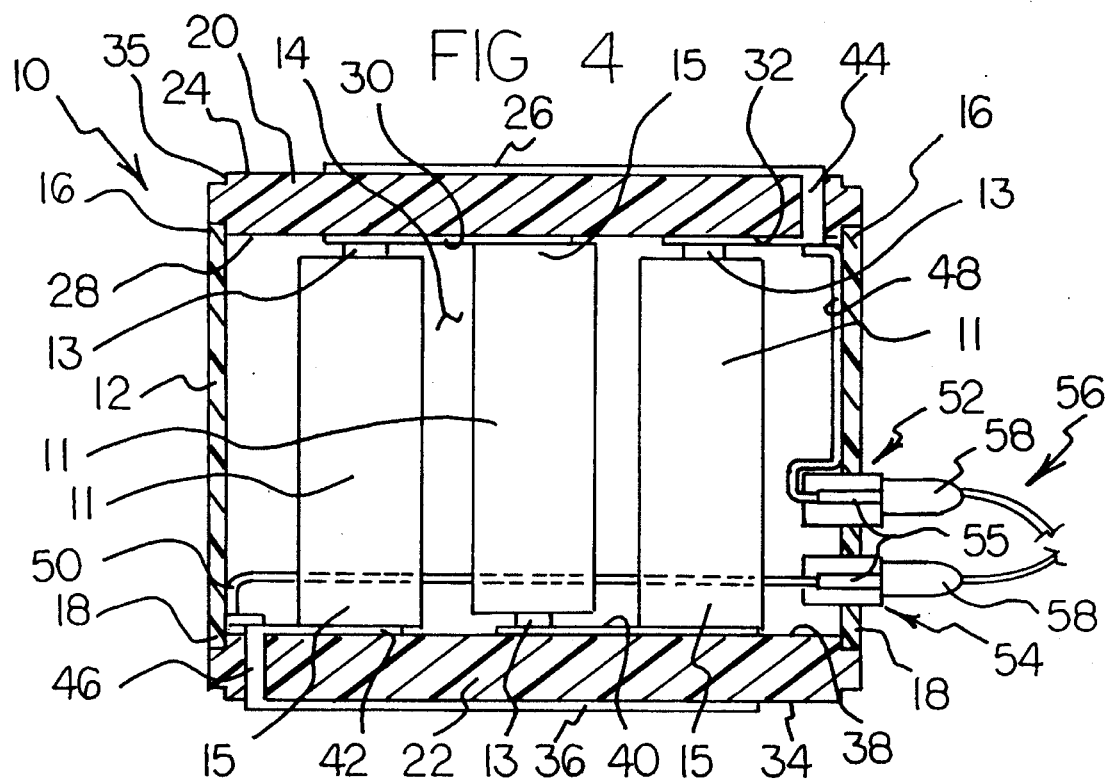

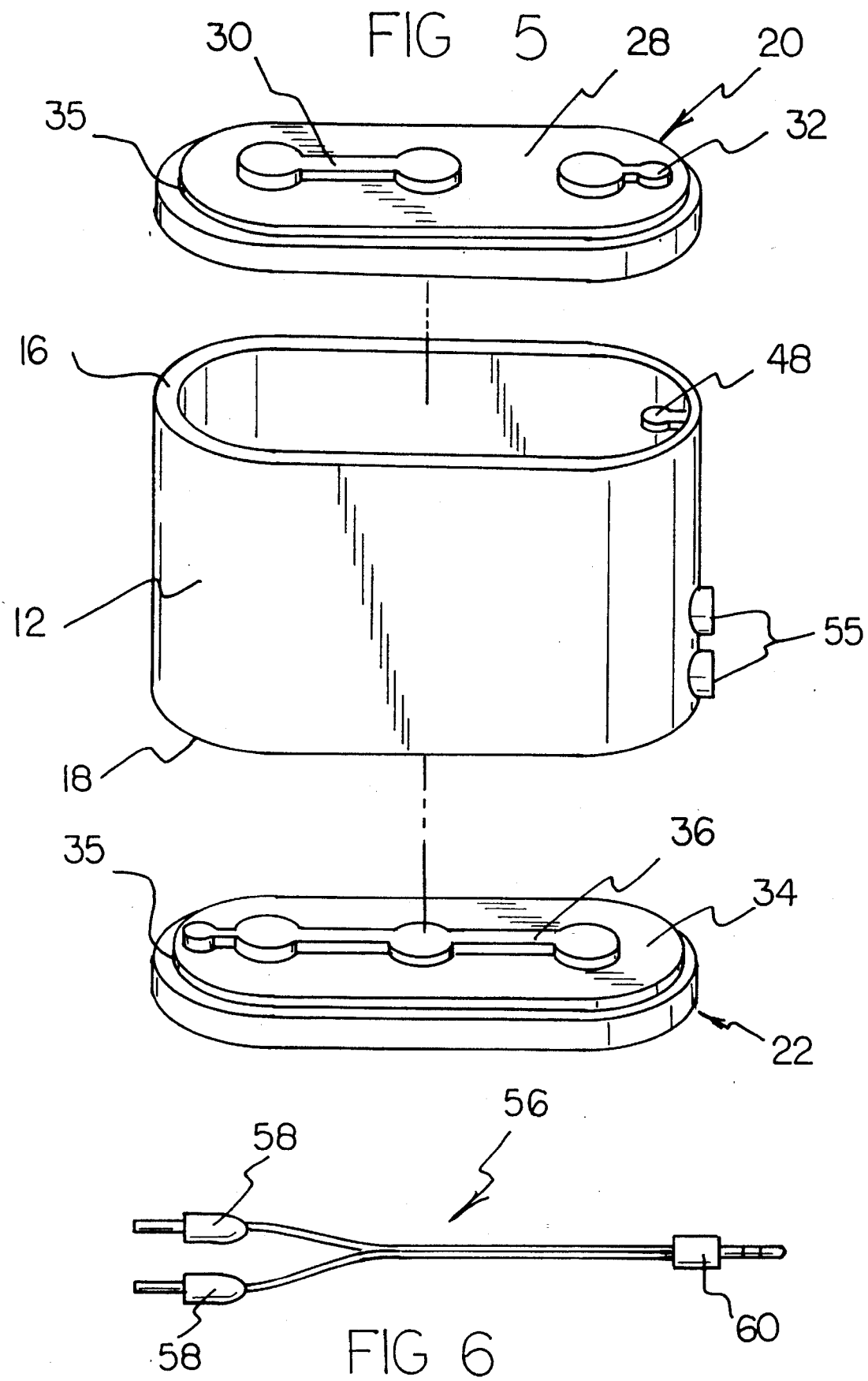

SELECTABLE CONNECTION BATTERY HOUSING APPARATUS

BACKGROUND OF THE INVENTION

1. Field of the Invention

The present invention relates generally to housing for a plurality of primary cell batteries and, more particularly, to a housing especially adapted for enabling a plurality of batteries therein to be electrically connected either in parallel or in series.

2. Description of the Prior Art

Large numbers of portable electrical and electronic devices are battery powered. Typical battery powered devices employ one or more individual batteries that, individually, are designed to provide approximately 1.5 volts. When a particular device needs 1.5 volts, one 1.5 volt battery is employed, or a plurality of 1.5 volt batteries are connected in parallel. When a particular device needs 3 volts, two 1.5 volt batteries are connected in series. When a particular device needs 6 volts, four 1.5 volt batteries are connected in series. Other multiples of 1.5 volts can also be used.

Many battery powered devices have input jacks to receive a plug that receives electrical power from a battery pack. Yet all of such devices do not require the same voltage source. Some require a 1.5 volt source; some require a 3 volt source; some require a 6 volt source, and so on. In this respect, it would be desirable if a battery pack apparatus were provided which could be adaptable to providing a variety of battery-powered electrical devices.

As 1.5 volt batteries are used, their voltage output gradually drops. Eventually, the actual voltage output is so far below the specified or expected voltage output that the batteries are considered worn out and need to be replaced. However, when a 1.5 volt battery is so-called worn out, it is not a totally dead battery. That is, it generally provides a measurable just below a required voltage. If one or more worn out batteries, that are originally connected in parallel, are reconnected in series, than the voltage output is cumulative, and the cumulative voltage output may be more than the required 1.5 volts. In this respect, it would be desirable ff a battery pack apparatus were provided that enabled a plurality of worn out 1.5 volt batteries to be connected in series to provide a cumulative voltage that is equal to or greater than 1.5 volts.

Throughout the years, a number of innovations have been developed relating to apparatuses designed to either connect a plurality of batteries in parallel or in series depending upon a specific voltage required. The following U.S. Pat. Nos. are representative of some of those innovations: 3,718,848; 4,409,537; 4,581,570; 5,121,046; and 5,230,967. More specifically, U.S. Pat. No. 3,718,848 a complex battery and charger system that includes switching for connecting a plurality of batteries to a motor and includes switching for connecting the batteries to a charger. Often, batteries used in portable battery-powered devices are not rechargeable batteries. Therefore, the presence of complex charging and switching circuitry would be superfluous. In this respect, it would be desirable if a battery pack apparatus were provided which does not include battery charging apparatus.

U.S. Pat. No. 4,409,537 discloses plural groups of individual batteries that are connected together in such a way to provide a positive voltage, a negative voltage, and a neutral voltage therebetween. The batteries appear to be connected together in one specific way to provide the positive, negative, and neutral voltages. There does not appear to be any disclosure of a selection between different positive voltages.

U.S. Pat. No. 4,581,570 discloses a switch assembly for a multiple power cell unit which is designed to provide booster power to a battery by interconnecting the terminals of the cells from an original standby parallel connection to a series connection when terminal connecting busses and their contact elements are moved from parallel to series connection. With this device, a sliding plate is used to switch batteries from a series to parallel connection and vice versa. A difficulty that may be encountered in using a sliding plate is the possibility that a sliding plate may inadvertently be slid from a desired position to an undesired position. In this respect, it would be desirable if a battery pack apparatus were provided which enabled selective connection of batteries in either parallel or series without using a sliding connection plate.

U.S. Pat. No. 5,121,046 discloses an automatic series/parallel battery connecting arrangement. This device employs complex voltage sensing components and complex switching circuit elements that are switched automatically from a parallel to a series mode which more voltage is required. A large number of solid-state electronic components are employed, and a complex assembly effort is required to connect so many distinct electronic components together. In this respect, it would be desirable if a battery pack apparatus were provided that avoids the use of solid-state electronic components and avoids the need to assemble a complex array of solid-state components together.

U.S. Pat. No. 5,230,967 discloses a battery which includes a plurality of electrochemical cell units that are selectively connected together either in parallel or in series. Connector devices of opposite polarity may be provided symmetrically on either side of a centerline about which the unit cell can be rotated 180 degrees to be stacked in either of two orientations. The connector devices are provided at adjacent corners of rectangular unit cells. A problem associated with this device is that the individual electrochemical cell units are not housed in housing. Moreover, a stack of electrochemical cell units must be carefully positioned with respect to each other in one stack arrangement or another stack arrangement depending upon whether a parallel or a series arrangement is being employed. In this respect, it would be desirable if a battery pack apparatus provides an adequate housing for a plurality of alternatively connectable battery units. Furthermore, it would be desirable if a battery pack apparatus were provided in which a plurality of electrochemical cell units need not be carefully stacked or restacked with respect to each other depending upon whether a parallel or series arrangement is employed.

Still other features would be desirable in a selectable connection battery housing apparatus. For example, a housing may be viewed as having a top, a bottom, and sides in between. It may be desirable to place electrical conductors in the top and the bottom, and it would be desirable to be able to select between parallel and series connection of batteries by altering orientations of the housing top and bottom.

Another desirable feature of a selectable connection battery housing apparatus is to be able to readily switch the polarity of the power output from the apparatus. That is, it would be desirable to be able to selectively provide either a positive or a negative voltage from the batteries employed.

Since one selectable connection battery housing apparatus can be used for a plurality of different battery-powered devices, it would be desirable if the selectable connection battery housing apparatus could be carried by a person in a hands-free manner so as to leave the hands free to operate the device that is connected to and powered by the selectable connection battery housing apparatus. In this respect, it would be desirable if a battery pack apparatus were provided with a clip that enabled the selectable connection battery housing apparatus to be readily connected to an article of clothing so that the selectable connection battery housing apparatus can be carried in a hands-free manner.

Thus, while the foregoing body of prior art indicates it to be well known to selectively connect batteries in either parallel or series arrangements, the prior art described above does not teach or suggest a selectable connection battery housing apparatus which has the following combination of desirable features: (1) is adapted to providing battery power to a variety of battery-powered electrical devices; (2) enables a plurality of worn out 1.5 volt batteries to be connected in series to provide a cumulative voltage that is equal to or greater than 1.5 volts; (3) does not include battery charging apparatus; (4) enables selection between different positive voltages; (5) enables selective connection of batteries in either parallel or series without using a sliding connection plate; (6) avoids the use of solid-state electronic components and avoids the need to assemble a complex array of solid-state components together; (7) provides a housing for a plurality of alternatively connectable battery units; (8) provides a battery pack apparatus in which a plurality of electrochemical cell units need not be carefully stacked or restacked with respect to each other depending upon whether a parallel or series arrangement of battery connection is employed; (9) has electrical conductors in the top and the bottom portions of a housing and provides selection between parallel and series connection of batteries by altering orientations of the housing top and bottom; (10) enables one to selectively provide either a positive or a negative voltage from the batteries employed; and (11) is provided with a clip that enables the selectable connection battery housing apparatus to be readily connected to an article of clothing so that the selectable connection battery housing apparatus can be carried in a hands-free manner. The foregoing desired characteristics are provided by the unique selectable connection battery housing apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a selectable connection battery housing apparatus for a plurality of batteries that have a positive end and a negative end. The selectable connection battery housing apparatus includes a central wall assembly which defines a battery receiving region. The central wall assembly includes a first end portion and a second end portion. A first housing cap assembly is selectively connectable to and removable from the first end portion of the central wall assembly. The first housing cap assembly includes a first surface which includes a first conductive strip adapted to connect to at least three first ends of three batteries retained in the battery receiving region inside the central wall assembly. The first housing cap assembly includes a second surface opposite to the first surface. The second surface includes a second conductive strip adapted to contact first ends of two of the at least three batteries and includes a third conductive strip adapted to contact a first end of one of the at least three batteries. A first bridge conductor is connected between the first conductive strip and the third conductive strip of the first housing cap assembly.

A second housing cap assembly is selectively connectable to and removable from the second end portion of the central wall assembly. The second housing cap assembly includes a first surface which includes a first conductive strip adapted to connect to at least three second ends of the at least three batteries. The second housing cap assembly includes a second surface opposite to the first surface. The second surface includes a second conductive strip adapted to contact two second ends of two of the at least three batteries and includes a third conductive strip adapted to contact a second end of one of the at least three batteries. A second bridge conductor is connected between the first conductive strip and tho third conductive strip of the second housing cap assembly.

A first side wall conductor, attached to the central wall assembly, is adapted to connect to the first bridge conductor of the first housing cap assembly. A second side wall conductor, attached to the central wall assembly, is adapted to connect to the second bridge conductor of the second housing cap assembly. A first output assembly is connected to the first side wall conductor. A second output assembly is connected to the second side wall conductor. An output connector assembly is connected to the first output assembly and the second output assembly and is adapted for supplying electrical power from the at least three batteries to a battery-powered device. The first output assembly and the second output assembly are comprised of jacks, and the output connector assembly includes first plugs adapted to connect with the jacks and a second plug adapted to connect to a jack for a battery-powered device.

A garment clip assembly is attached to the central wall assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved selectable connection battery housing apparatus which has all of the advantages of the prior art and none of the disadvantages.

It is another object of the present invention to provide a new and improved selectable connection battery housing apparatus which may be easily and efficiently manufactured and marketed.

It is a further object of the present invention to provide a new and improved selectable connection battery housing apparatus which is of durable and reliable construction.

An even further object of the present invention is to provide a new and improved selectable connection battery housing apparatus which is susceptible of a low cost of manufacture with regard to both materials and labor, and which accordingly is then susceptible of low prices of sale to the consuming public, thereby making such selectable connection battery housing apparatus available to the buying public.

Still yet a further object of the present invention is to provide a new and improved selectable connection battery housing apparatus which is adapted to providing battery power to a variety of battery-powered electrical devices.

Still another object of the present invention is to provide a new and improved selectable connection battery housing apparatus that enables a plurality of worn out 1.5 volt batteries to be connected in series to provide a cumulative voltage that is equal to or greater than 1.5 volts.

Yet another object of the present invention is to provide a new and improved selectable connection battery housing apparatus which does not include battery charging apparatus.

Even another object of the present invention is to provide a new and improved selectable connection battery housing apparatus that enables selection between different positive voltages.

Still a further object of the present invention is to provide a new and improved selectable connection battery housing apparatus which enables selective connection of batteries in either parallel or series without using a sliding connection plate.

Yet another object of the present invention is to provide a new and improved selectable connection battery housing apparatus that avoids the use of solid-state electronic components and avoids the need to assemble a complex array of solid-state components together.

Still another object of the present invention is to provide a new and improved selectable connection battery housing apparatus which provides a housing for a plurality of alternatively connectable battery units.

Yet another object of the present invention is to provide a new and improved selectable connection battery housing apparatus that provides a battery pack apparatus in which a plurality of electrochemical cell units need not be carefully stacked or restacked with respect to each other depending upon whether a parallel or series arrangement of battery connection is employed.

Still a further object of the present invention is to provide a new and improved selectable connection battery housing apparatus that has electrical conductors in the top and the bottom portions of a housing and provides selection between parallel and series connection of batteries by altering orientations of the housing top and bottom.

Yet another object of the present invention is to provide a new and improved selectable connection battery housing apparatus which enables one to selectively provide either a positive or a negative voltage from the batteries employed.

Still a further object of the present invention is to provide a new and improved selectable connection battery housing apparatus that is provided with a clip that enables the selectable connection battery housing apparatus to be readily connected to an article of clothing so that the selectable connection battery housing apparatus can be carried in a hands-free manner.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the selectable connection battery housing apparatus of FIG. 2 taken along line 3—3 thereof; in this figure, the top and bottom housing portions are oriented so that a plurality of batteries are arranged in a parallel orientation.

FIG. 4 is a cross-sectional view of the embodiment of the invention shown in FIG. 3 wherein the top and bottom housing portions are oriented so that a plurality of batteries are arranged in a series orientation.

FIG. 5 is an exploded view of the embodiment of the invention shown in FIG. 3 with the batteries removed.

FIG. 6 is a top view of a connector assembly of the selectable connection battery housing apparatus of the invention.

DESCRIPTION OF THE PREFERRED EMBODIMENT

With reference to the drawings, a new and improved selectable connection battery housing apparatus embodying the principles and concepts of the present invention will be described.

Figure 1:
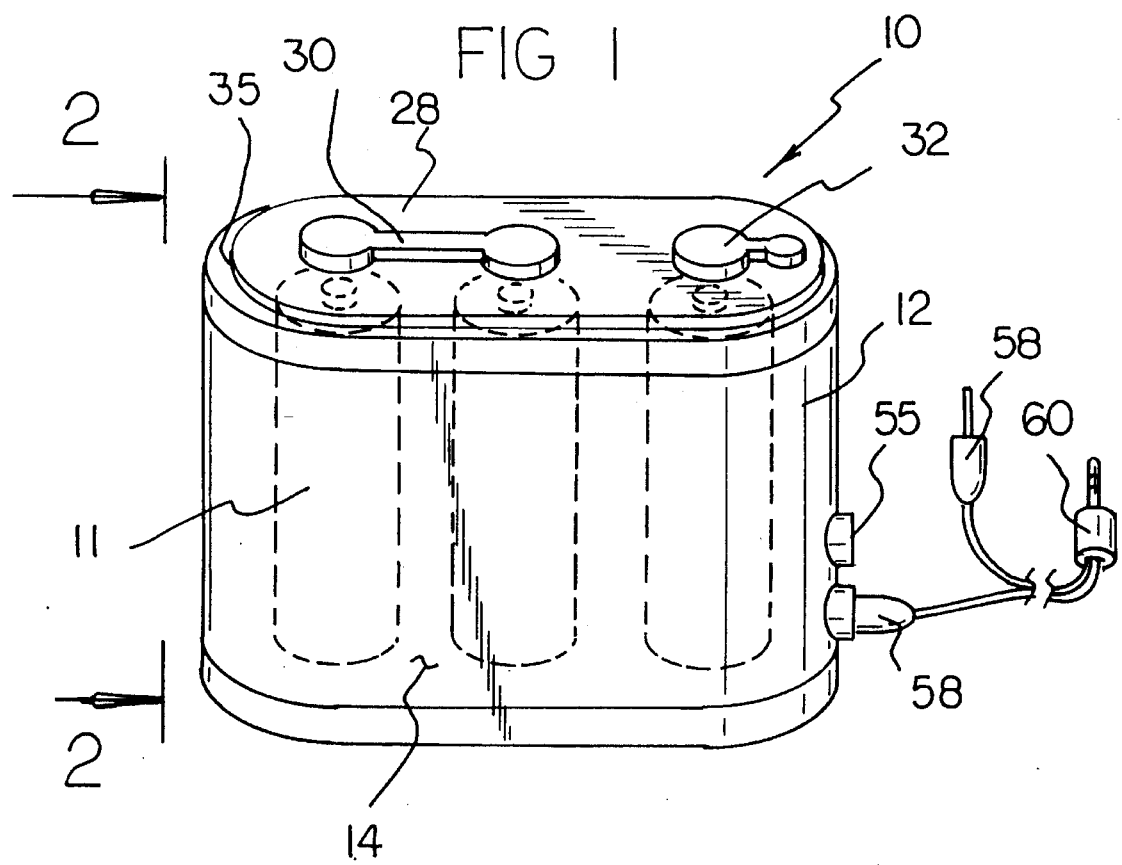
FIG. 1 is a perspective view showing a preferred embodiment of the selectable connection battery housing apparatus of the invention.
Figure 2:
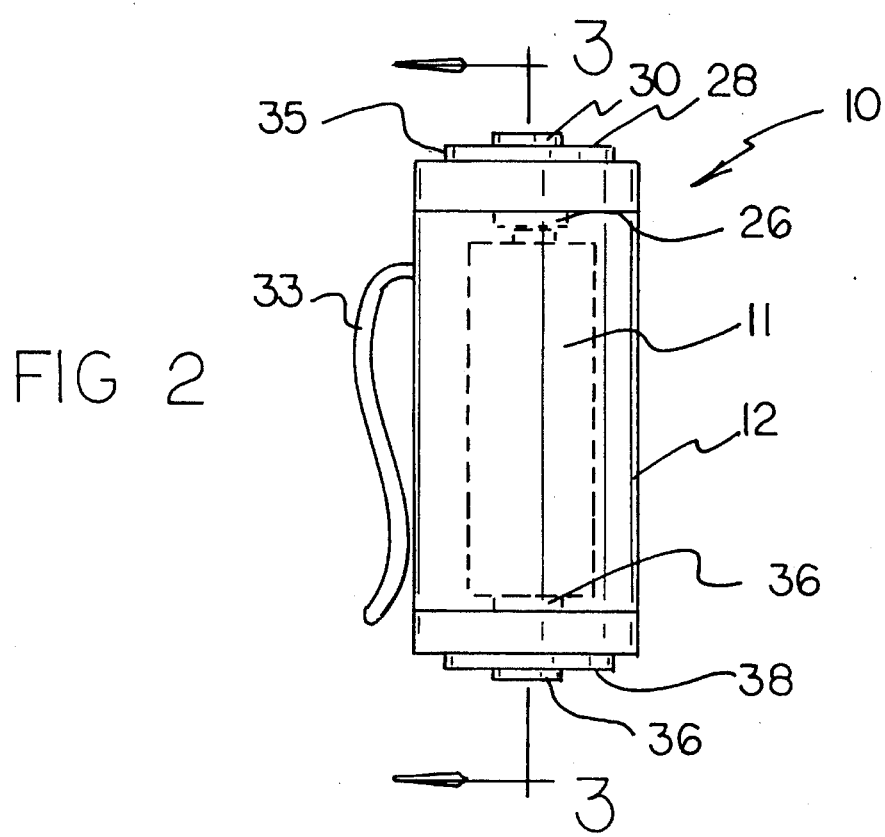
FIG. 2 is a side view of the embodiment of the selectable connection battery housing apparatus shown in FIG. 1.

Turning to FIGS. 1–3, there is shown an exemplary embodiment of the selectable connection battery housing apparatus of the invention, generally designated by reference numeral 10, in an orientation for three batteries 11 connected in parallel. In its preferred form, selectable connection battery housing apparatus 10 is provided for a plurality of batteries 11 that have a positive end 13 and a negative end 15. The selectable connection battery housing apparatus 10 includes a central wall assembly 12 which defines a battery receiving region 14. The central wall assembly 12 includes a first end portion 16 and a second end portion 18. A first housing cap assembly 20 is selectively connectable to and removable from the first end portion 16 of the central wall assembly 12. The first housing cap assembly 20 includes a first surface 24 which includes a first conductive strip 26 adapted to connect to at least three first ends of three batteries 11 retained in the battery receiving region 14 inside the central wall assembly 12. The first housing cap assembly 20 includes a second surface 28 opposite to the first surface 24. The second surface 28 includes a second conductive strip 30 adapted to contact first ends of two of the at least three batteries 11 and includes a third conductive strip 32 adapted to contact a first end of one of the at least three batteries 11. A first bridge conductor 44 is connected between the first conductive strip 26 and the third conductive strip 32 of the first housing cap assembly 20.

A second housing cap assembly 22 is selectively connectable to and removable from the second end portion 18 of the central wall assembly 12. The second housing cap assembly 22 includes a first surface 34 which includes a first conductive strip 36 adapted to connect to at least three second ends of the at least three batteries 11. The second housing cap assembly 22 includes a second surface 38 opposite to the first surface 34. The second surface 38 includes a second conductive strip 40 adapted to contact two second ends of two of the at least three batteries 11 and includes a third conductive strip 42 adapted to contact a second end of one of the at least three batteries 11. A second bridge conductor 46 is connected between the first conductive strip 36 and the third conductive strip 42 of the second housing cap assembly 22.

As can be seen from the figures, the first housing cap assembly 20 and the second housing cap assembly 22 can be identical structures.

A first side wall conductor 48, attached to the central wall assembly 12, is adapted to connect to the first bridge conductor 44 of the first housing cap assembly 20. A second side wall conductor 50, attached to the central wall assembly 12, is adapted to connect to the second bridge conductor 46 of the second housing cap assembly 22. A first output assembly 52 is connected to the first side wall conductor 48. A second output assembly 54 is connected to the second side wall conductor 50. An output connector assembly 56 is connected to the first output assembly 52 and the second output assembly 54 and is adapted for supplying electrical power from the at least three batteries 11 to a battery-powered device. The first output assembly 52 and the second output assembly 54 are comprised of jacks 55, and the output connector assembly 56 includes first plugs 58 adapted to connect with the jacks 55 and a second plug 60 adapted to connect to a jack for a battery-powered device.

A garment clip assembly 33 is attached to the central wall assembly 12. The garment clip assembly 33 permits the selectable connection battery housing apparatus 10 of the invention to be attached to an article of clothing worn by a user.

In operation, as shown in FIGS. 1–3, the selectable connection battery housing apparatus 10 of the invention can includes three batteries 11 arranged in the battery receiving region 14 of the central wall assembly 12 so that each of their positive ends 13 are oriented upward and their negative end 15 are oriented downward. As a result, the three batteries 11 are connected in parallel with the positive ends 13 in contact with the first conductive strip 26 of the first housing cap assembly 20 and with the negative ends 15 in contact with the first conductive strip 36 of the second housing cap assembly 22. With this arrangement, the first side wall conductor 48 is in contact with the first bridge conductor 44; the second side wall conductor 50 is in contact with the second bridge conductor 46; and the second plug 60 receives battery power from the first plugs 58 and the jacks 55. If the batteries 11 have a 1.5 volt output, the parallel voltage output is also 1.5 volts.

Turning to the orientation of the selectable connection battery housing apparatus 10 shown in FIG. 4, the first housing cap assembly 20 and the second housing cap assembly 22 have been selectively removed from the central wall assembly 12, reversed, and replaced back on the central wall assembly 12 by a friction fit. In addition, the orientation of the middle battery 11 has been reversed. More specifically, the second conductive strip 30 of the first housing cap assembly 20 is in contact with the positive end 13 of the left most battery 11 and is in contact with the negative end 15 of the middle battery 11. In addition, the positive end 13 of the middle battery 11 and the negative end 15 of the right most battery 11 are in contact with the second conductive strip 40 of the second housing cap assembly 22. Still further, the positive end 13 of the right most battery 11 is in contact with the third conductive strip 32 of the first housing cap assembly 20, and the negative end 15 of the left most battery 11 is in contact with the third conductive strip 42 of the second housing cap assembly 22.

With the arrangement of batteries 11 and conductive strips shown in FIG. 4, the batteries 11 are in series. As a result, at the second plug 60, the output voltage of the three 1.5 volt batteries 11, in series, is three times 1.5 volts equalling approximately 4.5 volts. Moreover, if the individual batteries 11 are worn so that the individual battery outputs are considerably below 1.5 volts, then when the batteries 11 are arranged in series, then the output voltage at second plug 60 will be less than 4.5 volts. However, unless the batteries 11 are extremely worn, the output voltage of three worn batteries would generally be greater than 3.0 volts. Therefore, the selectable connection battery housing apparatus 10 of the invention can be used to supply an output voltage greater than 3.0 volts from three worn batteries 11.

The first housing cap assembly 20 and the second housing cap assembly 22 can fit onto the central wall assembly 12 by use of friction fits. More specifically, the first housing cap assembly 20 and the second housing cap assembly 22 includes outer ridges 35 which fit by friction fit to the first end portion 16 and the second end portion 18 of the central wall assembly 12.

The components of the selectable connection battery housing apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved selectable connection battery housing apparatus that is low in cost, relatively simple in design and operation, and which may advantageously be used to provide battery power to a variety of battery-powered electrical devices. With the invention, a selectable connection battery housing apparatus is provided which enables a plurality of worn out 1.5 volt batteries to be connected in series to provide a cumulative voltage that is equal to or greater than 1.5 volts. With the invention, a selectable connection battery housing apparatus is provided which does not include battery charging apparatus. With the invention, a selectable connection battery housing apparatus is provided which enables selection between different positive voltages. With the invention, a selectable connection battery housing apparatus is provided which enables selective connection of batteries in either parallel or series without using a sliding connection plate.

With the invention, a selectable connection battery housing apparatus is provided which avoids the use of solid-state electronic components and avoids the need to assemble a complex array of solid-state components together. With the invention, a selectable connection battery housing apparatus provides a housing for a plurality of alternatively connectable battery units. With the invention, a selectable connection battery housing apparatus provides a battery pack apparatus in which a plurality of electrochemical cell units need not be carefully stacked or restacked with respect to each other depending upon whether a parallel or series arrangement of battery connection is employed. With the invention, a selectable connection battery housing apparatus is provided which has electrical conductors in the top and the bottom portions of a housing and provides selection between parallel and series connection of batteries by altering orientations of the housing top and bottom. With the invention, a selectable connection battery housing apparatus is provided which enables one to selectively provide either a positive or a negative voltage from the batteries employed. With the invention, a selectable connection battery housing apparatus is provided which is provided with a clip that enables the selectable connection battery housing apparatus to be readily connected to an article of clothing so that the selectable connection battery housing apparatus can be carried in a hands-free manner.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A selectable connection battery housing apparatus for a plurality of batteries having a positive end and a negative end, comprising:

a central wall assembly which defines a battery receiving region, said central wall assembly including a first end portion and a second end portion, a first housing cap assembly selectively connectable to and removable from said first end portion of said central wall assembly, said first housing cap assembly including a first surface which includes a first conductive strip adapted to connect to at least three first ends of three batteries, said first housing cap assembly including a second surface opposite to said first surface, said second surface including a second conductive strip adapted to contact first ends of two of the at least three batteries and including a third conductive strip adapted to contact a first end of one of the at least three batteries, a first bridge conductor connected between said first conductive strip and said third conductive strip of said first housing cap assembly, a second housing cap assembly selectively connectable to and removable from said second end portion of said central wall assembly, said second housing cap assembly including a first surface which includes a first conductive strip adapted to connect to at least three second ends of the at least three batteries, said second housing cap assembly including a second surface opposite to said first surface, said second surface including a second conductive strip adapted to contact two second ends of two of the at least three batteries and including a third conductive strip adapted to contact a second end of one of the at least three batteries, a second bridge conductor connected between said first conductive strip and said third conductive strip of said second housing cap assembly, a first side wall conductor, attached to said central wall assembly, adapted to connect to said first bridge conductor of said first housing cap assembly, a second side wall conductor, attached to said central wall assembly, adapted to connect to said second bridge conductor of said second housing cap assembly, a first output assembly connected to said first side wall conductor, a second output assembly connected to said second side wall conductor, and an output connector assembly, connected to said first output assembly and said second output assembly, adapted for supplying electrical power from the at least three batteries to a battery-powered device.

2. The apparatus of claim 1 wherein:

said first output assembly and said second output assembly are comprised of jacks, and said output connector assembly includes first plugs adapted to connect with said jacks and a second plug adapted to connect to a jack for a battery-powered device.

3. The apparatus of claim 1, further including:

a garment clip assembly attached to said central wall assembly.

* * * * *